May 12, 1953

C. E. BARSTOW ET AL 2,638,042

COMBINED PLOW AND SOIL PULVERIZER

Filed April 16, 1947

INVENTOR.
CHARLES E. BARSTOW
ALVA H BARSTOW
BY ALVA K BARSTOW

ATTORNEY.

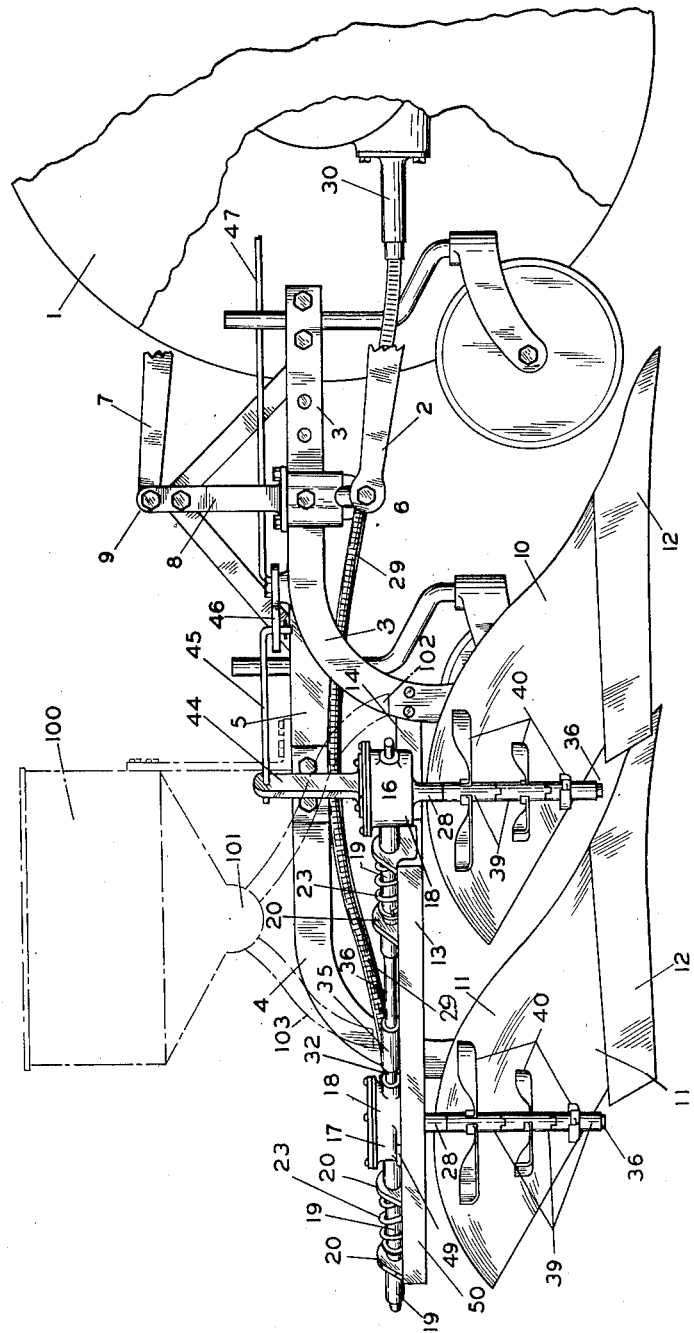

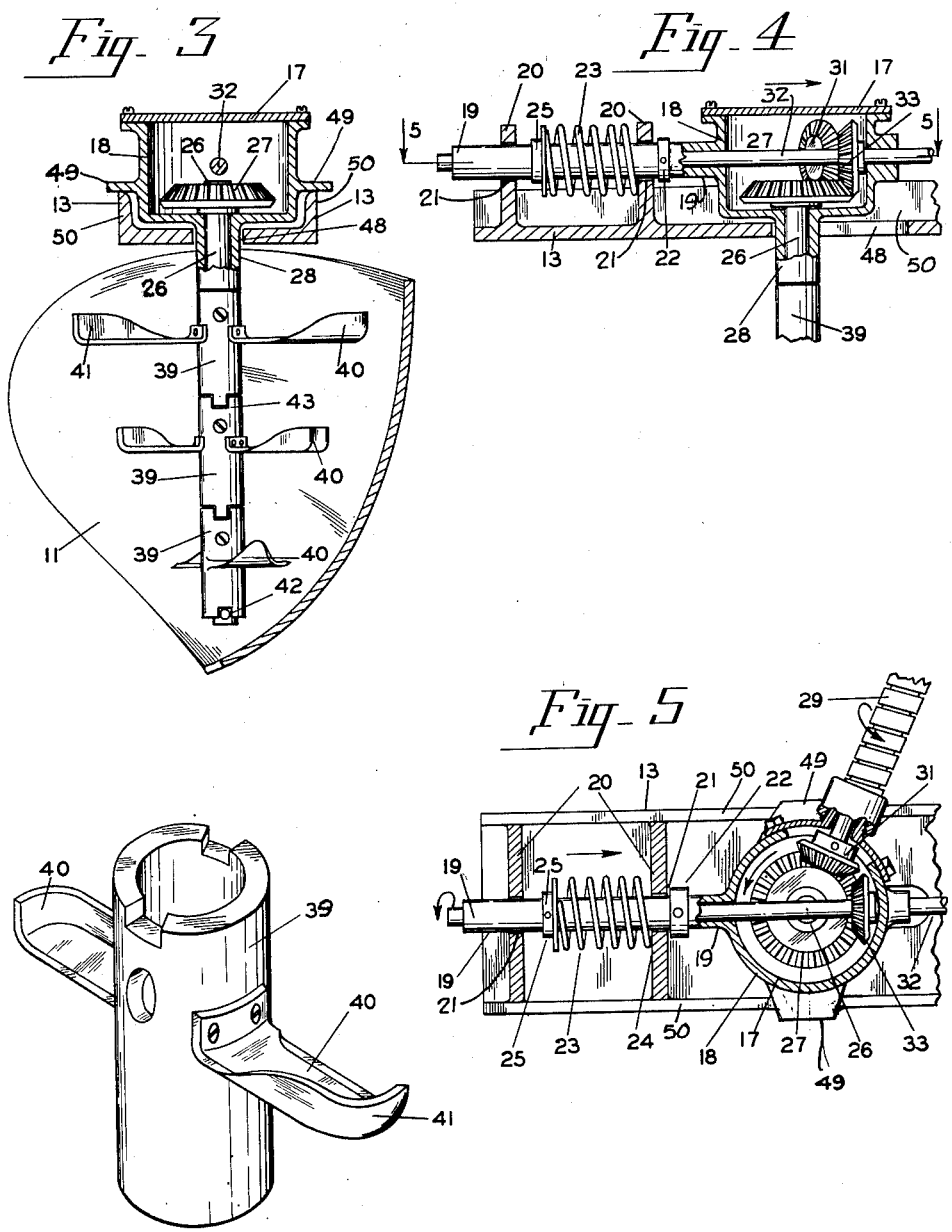

May 12, 1953  C. E. BARSTOW ET AL  2,638,042
COMBINED PLOW AND SOIL PULVERIZER
Filed April 16, 1947  4 Sheets-Sheet 4

INVENTOR.
CHARLES E. BARSTOW
ALVA H. BARSTOW
BY ALVA K. BARSTOW

ATTORNEY

Patented May 12, 1953

2,638,042

UNITED STATES PATENT OFFICE 2,638,042

COMBINED PLOW AND SOIL PULVERIZER

Charles E. Barstow, Portland, Alva H. Barstow, Oceanlake, and Alva K. Barstow, Portland, Oreg.

Application April 16, 1947, Serial No. 741,754

11 Claims. (Cl. 97—38)

This invention relates to soil pulverizers, and is particularly adapted to be mounted to the plow beams of a plow.

The primary object of our invention is to mount a portable soil pulverizer to a conventional plow without altering the plow, the puverizer consisting of cutting or pulverizing rotors located adjacent the side of the mold boards of the plow.

A further object of our invention is to provide means of rotating the pulverizing rotors at a relatively high speed so that the soil being turned by the mold boards will be cut away and pulverized.

A further object of our invention is to provide driving heads for rotating the rotors that are associated with framework that can be readily mounted to any plow without altering the plow.

When our new and improved soil pulverizer is being used in connection with the mold boards of plows for pulverizing the soil the rotors rotate on a vertical axis.

A further object of our invention is the provision of adapters for mounting the rotors on a relatively horizontal position or axis and when used in this position the device acts as a cultivator or tiller. When the rotors are mounted to the plow for tilling or cultivating, the mold boards and shears or shares should be removed.

Our invention works exceptionally well with plows that are mounted to the rear of tractors, the plow beams acting as supports for our soil pulzerizer while being either used as a pulverizer in connection with the mold boards or when the mold boards and shares are removed and our invention is adapted to be used as a cultivator or tiller.

A further object of our invention is to mount a fertilizer hopper on the plow for distributing fertilizer into the rotors for mixing the same with the pulverized soil.

These and other incidental objects will be apparent in the drawings, specification and claims.

Referring to the drawings:

Figure 2 is a side view of Figure 1, parts being broken away for convenience of illustration.

Figure 3 is a fragmentary enlarged sectional view taken on line 3—3 of Figure 1, illustrating in detail the construction of the driving head and the rotor.

Figure 4 is an enlarged fragmentary sectional view taken on line 4—4 of Figure 1.

Figure 5 is an enlarged fragmentary sectional plan view taken on line 5—5 of Figure 4, illustrating the flexible drive and one of the driving heads and its mounting.

Figure 6 is an enlarged perspective view of one of the rotor units removed from the rotor shaft.

In the drawings:

Figure 1:
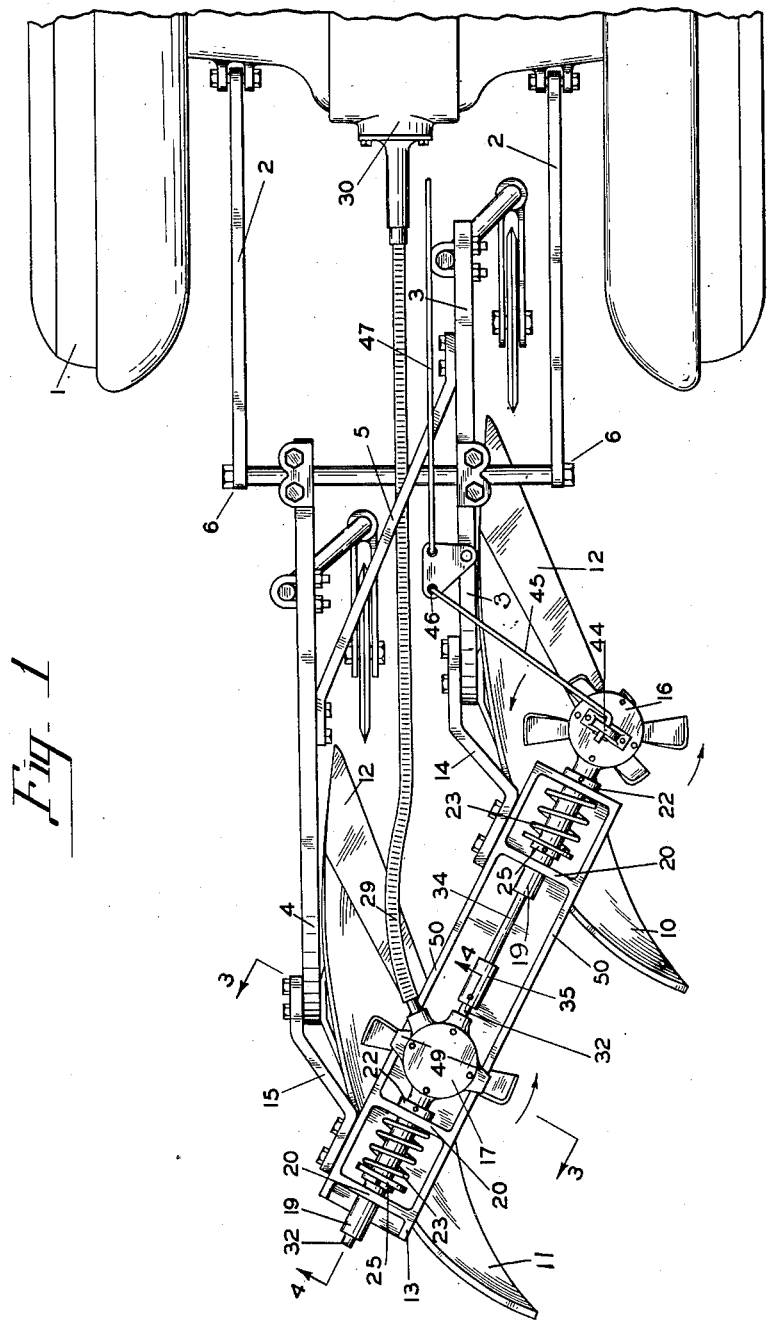
Figure 1 is a plan view of our new and improved soil pulverizer mounted to the plow beams of a plow, said plow being hooked up to the rear of a tractor.

We have illustrated a well known type of plow attached to a tractor 1 through draw bars 2. The plow beams 3 and 4 are secured together by the usual cross bracing 5, the beams being pivotally mounted to the draw bars 2 at 6. The beams are raised and lowered by the link 7 which leads to the tractor control levers not here shown, on its one end and is pivotally mounted to the upright frame 8 at 9 at its opposite end. The mold boards 10 and 11 are mounted to the beams 3 and 4 in the usual manner, also the plow shares 12. The above elements are well known in plow and tractor construction.

Our invention consists in mounting a frame 13 to the plow beams 3 and 4 by the bracket arms 14 and 15, although we do not wish to be limited to the exact method of mounting. We have illustrated our soil pulverizer mounted to a plow having two beams, but our invention may be mounted to a plow having any number of beams, as each mold board must have one of our rotors mounted adjacent thereto.

The frame 13 is disposed substantially horizontally and diagonally of the plow beams midway of the moldboards 10 and 11, and driving heads 16 and 17 are slidably mounted to the frame 13 for movement longitudinally of the frame. The driving heads consist of casings 18 having radial tubular extensions 19 forming part thereof and passing through bearings 21 in the bearing guides 20, which form part of the frame 13. Stop collars 22 are adjustably mounted to the tubular member 19. Springs 23 bear against one of the bearing supports or guides 20 at 24 at their one end and against the adjustable collar 25 at their opposite end. This spring action maintains the collar 22 against the bearing guide 20, best illustrated in Figures 4 and 5. The object and purpose of this flexible spring mounting will be later described.

The driving head 17 has a vertical stub shaft 26 keyed to the ring gear 27 in casing 18. The stub shaft is journalled within the downwardly extending bearing guide 28 forming part of the driving head 17 or casing 18 thereof. The gear 27 is driven by the flexible shaft 29 from the power take-off 30 on the tractor 1 through the pinion 31. We do not wish to be limited to driving our soil pulverizer by the tractor, as the same may be operated by other power methods.

The driving head assembly 16 is driven by the cross shaft 32, which has a pinion 33 keyed thereto and driven by the ring gear 27. The shaft 32 drives the shaft 34 of the driving head 16, which is coupled to the shaft 32 by the spline connection 35. The vertical shaft 36, of the driving head 16, is driven by the bevel gear 37, which is keyed thereto and by the pinion 38, which is keyed to the cross shaft 34.

We will now describe the vertical rotor. The shafts 26 and 36 extend downwardly in a relatively vertical position and have the individual tubular members or sleeves 39 mounted thereon below tubular bearing guides 28, as best illustrated in Figures 2 and 3. The tubular members have blades 40 fixedly secured thereto, preferably radially opposed and reduced in length downwardly to conform to the mold board curvature. These blades may be of any particular design or shape, as for instance a somewhat cupped portion 41 may be employed, although we do not wish to be limited to any particular design of pulverizing blade. Any suitable fastening means, as the key 42 may be inserted through the shafts 26 and 36 after the tubular units have interlocked together as by tongue and groove connections at 43.

As the vertical rotor assemblies are revolved, and in the event a solid object, as a rock, may come between the rotor blades and the mold board we have provided a means of allowing the rotor heads to move away from the mold board a limited amount. This is accomplished through the action of the springs 23 permitting the tubular members 19 to slide within their bearings 21 in the direction of the arrow (Fig. 5). This movement is permitted to happen due to the fact that the shafts 32 and 34 are splined together at 35, allowing individual movement of the driving heads.

We have provided a means of rotating the head assembly 16 approximately 90 degrees about the tubular member 19 raising the rotor head assembly to approximately a horizontal position. This becomes necessary while making the first round with the plow in order to clear the lower ends of said rotor from the first turned soil. This is accomplished by extending the arm 44 upwardly from the head 16 and connecting the upper end of the same with a connecting link 45 to the bell crank 46, which in turn is controlled by the control rod 47 from the tractor. This control assembly holds the rotor head in a vertical position while in operation and moves the same to a horizontal position rearwardly or outwardly of the plow as stated above when the first round is being made. It is desired to maintain the driving head 17 and its rotor in a vertical position at all times, and this is accomplished through the action of the bearing guide 28 passing down through a slot 48 within the frame 13, also ears 49 forming part of the housing or casing 18 ride on top of the legs or side flanges 50 of the frame 13 which may be of channel shape, as best illustrated in Figure 3.

Figure 7:
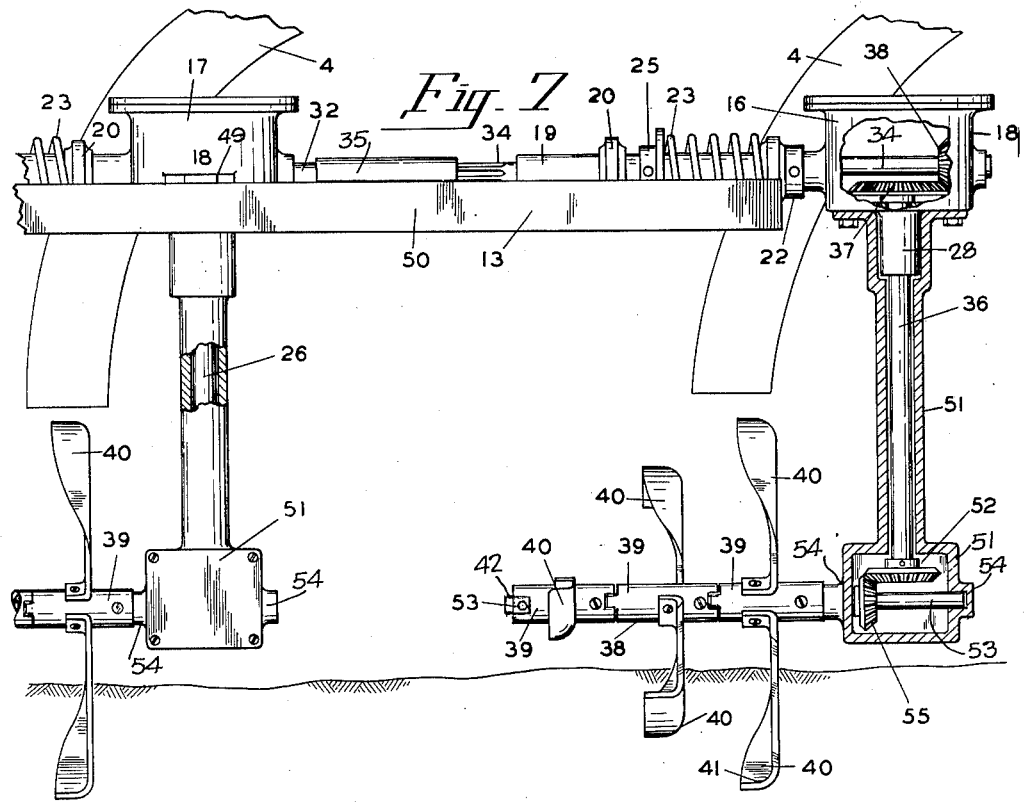
Figure 7 is a side view of our new and improved soil pulzerizer having been converted from a pulverizer to a cultivator and having horizontal rotors mounted thereto. This view shows the mold boards of the plow having been removed.
Figure 8:
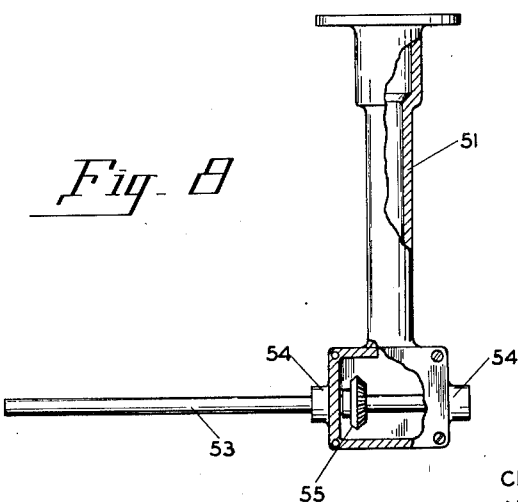
Figures 8 illustrates the attachment required to convert the rotors from vertical to horizontal position, or vice versa.

Referring to Figures 7 and 8, the rotor sleeves 39 and the cutter blades 40 have been removed from the vertical shafts 36 and 26 and the tubular members 51 are placed over these said shafts at the same time a pinion 52 is added and keyed to the lower end of said shafts. The tubular members 51 have horizontal shafts 53 journaled therein at 54. This shaft has a pinion 55 keyed thereto and meshing with the pinion 52 of said vertical shafts. The rotor sleeves 39 of cutter blades 40 are then mounted on the horizontal shafts 53, converting our new and improved soil pulverizer into a cultivator or tiller. The mold boards and shares of the plow are removed for the best operation of our invention as a cultivator.

The direction of the horizontal shafts 53 may be varied either at an angle to the direction of travel of the tractor as illustrated in Figure 7, or the tubular members 51 may be rotated about the center of the vertical shafts 26 and 36 as axes causing the horizontal shafts 53 to be adjusted at any position from parallelism with to a position at right angles to the direction of travel. This is one of the major features of our method of driving the said rotors while in a horizontal position where a cultivation may take place at right angles to the direction of travel, or the cultivation or tilling of the soil by the implement may take place with the cultivator axes disposed at an angle to the direction of travel.

Referring to Figure 2, we have illustrated in broken line position the hopper 100 mounted on the plow. The hopper has a metering device 101 which would be driven by a power drive not here shown. The object of the hopper and the meter is to distribute soil conditioner, as for instance a fertilizer, into the rotors on their rotation for mixing the same with the pulverized soil. This is accomplished through the distributing tubes 102 and 103.

We do not wish to be limited to the exact mechanical structure of our invention, as other mechanical equivalents may be substituted still coming within the scope of our claims.

What we claim is:

1. A soil cultivator comprising a substantially horizontal support, a substantially vertical shaft carrying a rotatable soil cultivating element, drive means connected to said shaft for driving said element, support means slidably mounted on said support and supporting said shaft for lateral rectilinear sliding displacement in a substantially horizontal direction while precluding pivotal displacement, and means biasing said shaft to a normal position relative to said support.

2. A soil cultivator as set forth in claim 1, wherein the support is provided with a bracket for attachment to a plow frame supporting a plow mold board and the cultivating element is positioned beside the mold board for cultivating soil as it is turned by said mold board, said shaft being slidable relative to said mold board, and said element being shaped to cooperate with and conform to the outer surface of said mold board and slidable in and out relative to said surface.

3. A soil cultivator comprising a substantially horizontal support, a pair of driving heads slidably mounted on said support for horizontal sliding movement, a substantially vertical shaft supported in driving relation with each of said heads for rectilinear lateral displacement therewith, drive means drivingly connected with one of said heads, a second and extensible drive means between and drivingly connected with each of said heads so that one head is driven from the other while permitting relative displacement therebetween, and rotatable soil cultivating elements mounted on said shafts.

4. A soil cultivator as set forth in claim 3, wherein one of the driving heads is pivotal on a horizontal axis and is connected by linkage to a hand lever to permit the operator to swing the shaft up so that the cultivating element will be inoperative while the other element remains in operative position.

5. A soil cultivator as set forth in claim 3, wherein the second drive means comprises a splined shaft extending between said heads to permit relative movement therebetween.

6. A soil cultivator and pulverizer for plows, comprising a horizontal support adapted to be mounted to the plow beam, in rear thereof over the mold-board of the plow, a driving head slidably mounted on said support outwardly of the mold-board for horizontal sliding movement in and out relative thereto, a shaft supported by said head for sliding movement therewith, said shaft being connected in driving relation with said head and adapted to be disposed in a vertical position, drive means operatively connected with said head to drive said shaft, and a soil cultivating and pulverizing element mounted on said shaft to be supported and driven thereby and adapted for movement in and out with the shaft and head, and when in a vertical position being disposed to move toward and away from the outer surface of the mold-board.

7. A soil cultivator and pulverizer for plows, comprising a horizontal diagonally arranged supporting frame fixedly mounted to the plow beam over the mold-board of the plow, a driving head slidably mounted on said frame for horizontal sliding movement diagonally forwardly and rearwardly longitudinally of said frame, a shaft supported by and in driving connection with said head and adapted to be disposed in a vertical position for sliding movement with the head, drive means operatively connected with said shaft at the head, and a soil cultivating and pulverizing element mounted on said shaft to rotate therewith, said shaft and element adapted to move in fixed relation to and with said head when slid in and out when passing obstructions, and when in a vertical position being disposed normally in conforming relation to the outer surface of the mold-board between the ends thereof and to move with the head away from said surface when passing an obstruction therebetween and then return to conforming position.

8. A soil cultivator for plows, comprising a horizontal diagonally arranged supporting frame adapted to be mounted in fixed position in rear of the plow beam, a driving head slidably mounted on said frame for substantially horizontal sliding movement longitudnially of said frame, a shaft supported in a vertical position by and in driving relation with said head, drive means operatively connected with said head to drive said shaft and supported therewith for longitudinal sliding movement in and out in the frame and normally held in, and a soil cultivating and pulverizing element mounted on said shaft to be supported and driven thereby for movement in or out to pass obstructions and hard objects.

9. A soil cultivator comprising a horizontal support, a cultivating unit including a substantially vertical shaft and a rotatable soil cultivating element in driving relation with said shaft, drive means connected to said shaft for driving said element, support means slidably mounted on said horizontal support and supporting said shaft for lateral rectilinear sliding displacement in a substantially horizontal direction, and means biasing said shaft to a normal position relative to said support means.

10. A soil cultivator as set forth in claim 9, wherein said shaft is connected to a horizontally disposed shaft and said cultivating element is mounted on one of said shafts to rotate therewith and comprises radially extending cultivators.

11. A soil cultivator and pulverizer for plows having a plurality of plow beams and mold-boards with shares, comprising a horizontally disposed diagonally arranged supporting frame, means for mounting said frame on the plow beams above the mold-boards, driving heads slidably mounted on said frame for movement longitudinally thereof, one said head being disposed outwardly of each mold-board, movably connected aligned horizontal shafts slidably journaled longitudinally of the frame and operatively connected with said heads, power means for driving said shafts, resilient means on the slidable shafts between the heads and frame to normally urge the heads independently inwardly, a shaft carried by each head in driving relation with said slidable shafts, means retaining the inner of said head carried shafts in vertical position, means normally retaining the outer of said head carried shafts in vertical position but selectively permitting said outer head carried shaft to swing from vertical to horizontal position about the axis of the slidable shafts, and a soil cultivating and pulverizing element mounted on each of said vertical shafts to simultaneously rotate therewith, whereby said vertical shafts and cultivating elements are adapted to independently move in fixed relation to and with their respective heads when slid in and out upon striking an obstruction, and when in vertical positions, said elements being each normally disposed in conforming relation to the outer surfaces of the respective mold-boards adjacent thereto and movable with the respective shaft and head away from the respective surface when a hard object passes between an element and the surface and then automatically return inwardly to conforming position.

CHARLES E. BARSTOW.
ALVA H. BARSTOW.
ALVA K. BARSTOW.

References Cited in the file of this patent

UNITED STATES PATENTS

| Number | Name | Date |
|---|---|---|
| 655,686 | Cawley | Aug. 14, 1900 |
| 948,820 | Mosher | Feb. 8, 1910 |
| 1,198,589 | Shellaberger | Sept. 19, 1916 |
| 1,266,328 | Schulte | May 14, 1918 |
| 1,605,707 | Carpenter | Nov. 2, 1926 |
| 1,620,510 | Beise et al. | Mar. 8, 1927 |
| 1,635,612 | Dick et al. | July 12, 1927 |
| 1,693,895 | Hall | Dec. 4, 1928 |
| 1,697,678 | Davidson | Jan. 1, 1929 |
| 1,732,862 | Ross et al. | Oct. 22, 1929 |

FOREIGN PATENTS

| Number | Country | Date |
|---|---|---|
| 85,224 | Austria | Aug. 25, 1921 |